United States Patent
Rose et al.

(10) Patent No.: US 9,956,683 B2
(45) Date of Patent: May 1, 2018

(54) STEEL WORK BOX

(71) Applicants: Keith E Rose, Culpeper, VA (US); John H Boldridge, III, Rixeyville, VA (US)

(72) Inventors: Keith E Rose, Culpeper, VA (US); John H Boldridge, III, Rixeyville, VA (US)

( * ) Notice: Subject to any disclaimer, the term of this patent is extended or adjusted under 35 U.S.C. 154(b) by 0 days. days.

(21) Appl. No.: 15/131,477

(22) Filed: Apr. 18, 2016

(65) Prior Publication Data

US 2016/0318175 A1     Nov. 3, 2016

Related U.S. Application Data

(60) Provisional application No. 62/154,079, filed on Apr. 28, 2015.

(51) Int. Cl.
*B25H 3/02* (2006.01)
*B65D 90/14* (2006.01)
*B65D 88/10* (2006.01)

(52) U.S. Cl.
CPC .............. *B25H 3/02* (2013.01); *B65D 88/10* (2013.01); *B65D 90/14* (2013.01)

(58) Field of Classification Search
CPC .......... B25H 3/02; B65D 25/10; B65D 43/16; B65D 43/22; B65D 88/10; B65D 88/52; B65D 90/00; B65D 90/004; B65D 90/0053; B65D 90/006; B65D 90/0066; B65D 90/008; B65D 90/14; B65D 90/143; B65D 90/146; B65D 90/16

USPC .......... 206/372, 373, 386, 595–600; 220/1.5, 220/4.28, 6, 7
See application file for complete search history.

(56) References Cited

U.S. PATENT DOCUMENTS 3,040,925 A * 6/1962 Mills .................... B65D 88/528
                                            206/521
3,490,583 A * 1/1970 Cook ................. B65D 71/0096
                                            206/386

(Continued)

FOREIGN PATENT DOCUMENTS

JP           2006167883 A  *  6/2006  ............... B25H 3/02

*Primary Examiner* — Bryon Gehman
(74) *Attorney, Agent, or Firm* — Welsh Flaxman & Gitler LLC

(57) ABSTRACT

A metal work box includes a base having a horizontal planar member having an upper surface and a lower surface. The metal work box also includes a plurality of side walls secured to and extending upwardly from the base. The plurality of side walls include a front first side wall formed along a front first edge of the base, a back second side wall formed along a rear second edge of the base, a left third side wall formed along a left side third edge of the base, and right fourth side wall formed along a right side fourth edge of the base. A door is formed along the front first side wall. The door includes a door panel having a free edge and a hinged edge, the hinged edge being pivotally secured to a front hinge side wall portion of the front first side wall so as to enable easy access to contents. The front first side wall also includes a latch extending between a front latch side wall portion of the front first side wall and the free edge of the door panel to allow for selective latching of the door panel to the front latch side wall portion to keep the door securely closed.

14 Claims, 4 Drawing Sheets

(56) References Cited

U.S. PATENT DOCUMENTS

| | | | | |
|---|---|---|---|---|
| 3,618,806 | A * | 11/1971 | Coleman | B65D 88/522 220/7 |
| 3,746,203 | A * | 7/1973 | Cipolla | B65D 7/26 220/6 |
| 4,000,827 | A * | 1/1977 | Emery | B65D 11/1873 220/4.28 |
| 4,151,925 | A * | 5/1979 | Glassmeyer | B65D 88/005 206/386 |
| 4,273,394 | A * | 6/1981 | Chandler | A45C 13/02 206/373 |
| 4,653,658 | A * | 3/1987 | Karpisek | B65D 77/061 220/4.28 |
| 4,998,634 | A * | 3/1991 | Nessfield | B65D 90/008 220/1.5 |
| 5,052,569 | A * | 10/1991 | Cooper | B65D 90/24 220/1.5 |
| 5,286,079 | A * | 2/1994 | Zubko | B62D 33/04 220/1.5 |
| 5,626,231 | A * | 5/1997 | Kwong | B65D 19/14 206/386 |
| 5,671,854 | A * | 9/1997 | Thomas | B65D 88/12 220/1.5 |
| 5,706,946 | A | 1/1998 | Kakizaki et al. | |
| 6,182,849 | B1 * | 2/2001 | Elstone, Sr. | B65D 19/12 206/600 |
| 6,432,528 | B1 * | 8/2002 | Faust | B65B 51/067 428/343 |
| D545,568 | S | 7/2007 | Laga et al. | |
| 8,668,133 | B2 * | 3/2014 | Moehlig | C09J 7/02 206/599 |
| 9,382,740 | B2 * | 7/2016 | Flannery | E05D 7/10 |

\* cited by examiner

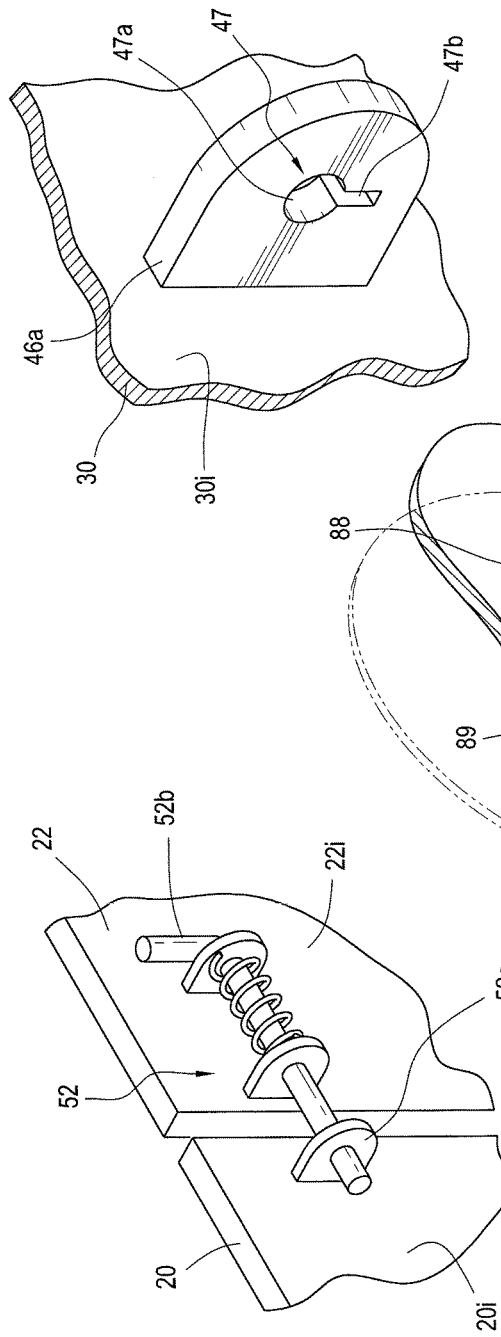
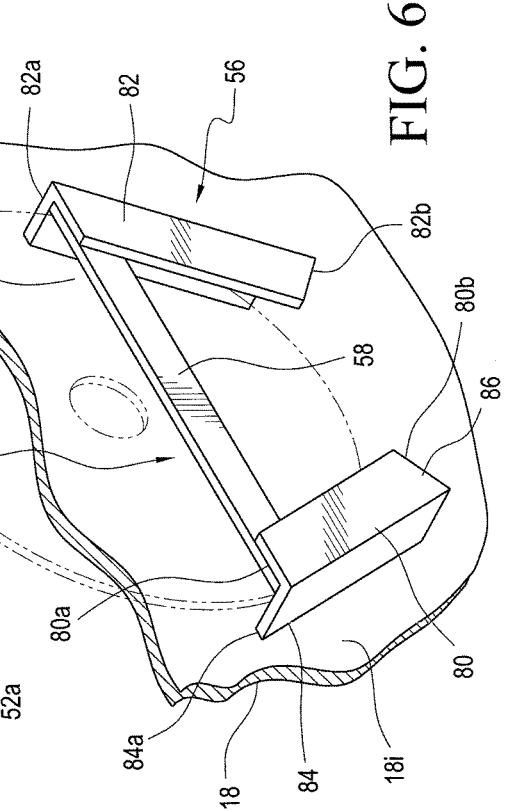

STEEL WORK BOX

CROSS REFERENCE TO RELATED APPLICATION

This application claims the benefit of U.S. Patent Application Ser. No. 62/154,079, filed Apr. 28, 2015, entitled "STEEL WORK BOX."

BACKGROUND OF THE INVENTION

1. Field of the Invention

The invention relates to a work box for storage and transport of tools at a work site.

2. Description of the Related Art

On a construction site multiple employees start out their shift by unloading tools and equipment from a storage container and into the front bucket of a front loader. The tools and equipment are then moved via the front loader to the work location and unloaded. Each time the work location changes throughout the shift the tools and equipment are loaded, moved and unloaded. Finally, at the end of the shift the tools and equipment are loaded once more, transported and unloaded out of the loader bucket back into the storage container. This common practice requires an enormous amount of time each day. Also, expensive tools and equipment are frequently damaged during transfer in the insecure bucket of a front loader.

SUMMARY OF THE INVENTION

The present invention provides a heavy duty all metal welded work box that can be preloaded and conveniently stored, eliminating the hassle of loading and unloading tools and equipment daily. The work box can be easily moved from a storage container to a work location or from work location to work location, while providing protection to its contents during the convoy. The present work box saves money by increasing productivity and minimizes tool and equipment breakage. The work box not only prevents damage to tools and equipment but also preserves their longevity.

It is, therefore, an object of the present invention to provide a metal work box including a base having a horizontal planar member having an upper surface and a lower surface. The metal work box also includes a plurality of side walls secured to and extending upwardly from the base. The plurality of side walls include a front first side wall formed along a front first edge of the base, a back second side wall formed along a rear second edge of the base, a left third side wall formed along a left side third edge of the base, and right fourth side wall formed along a right side fourth edge of the base. A door is formed along the front first side wall. The door includes a door panel having a free edge and a hinged edge, the hinged edged being pivotally secured to a front hinge side wall portion of the front first side wall so as to enable easy access to contents. The front first side wall also includes a latch extending between a front latch side wall portion of the front first side wall and the free edge of the door panel to allow for selective latching of the door panel to the front latch side wall portion to keep the door securely closed.

It is also an object of the present invention to provide a metal work box wherein the upper surface of the horizontal planar member is provided with an anti-slip textured coating for safety.

It is another object of the present invention to provide a metal work box wherein the base includes first and second elongated C-channel bars secured to the lower surface of the horizontal planar member increasing the ability of the work box to more weight.

It is a further object of the present invention to provide a metal work box wherein the base includes first and second I-beams secured to the first and second elongated C-channel bars to elevate the work box and allow for relocation.

It is also an object of the present invention to provide a metal work box wherein each of the first and second I-beams has two holes to create tie down points.

It is another object of the present invention to provide a metal work box wherein the free edge of the door panel includes two tabs extending beyond the free edge of the door panel so as to engage a front latch side wall portion of the first front side wall and prevent over swing of the door to the inside.

It is a further object of the present invention to provide a metal work box wherein the latch is located on the interior of the box to prevent damage to the latch itself.

It is also an object of the present invention to provide a metal work box including a plurality of hooks formed along at least one of the plurality of side walls for hanging or securing tools.

It is another object of the present invention to provide a metal work box including two chains and two chain fasteners permanently attached to at least one of the plurality of side walls.

It is a further object of the present invention to provide a metal work box wherein the work box includes four corners defined by the intersection of the front first side wall with the respective left third side wall and right fourth side wall and the intersection of the rear second side wall with the respective left third side wall and right fourth side wall, wherein each of the four corners includes a gusset.

It is also an object of the present invention to provide a metal work box wherein the gussets adjacent the front first side wall are sized to accommodate vises, while the gussets adjacent the rear second side wall provide support and stability.

It is another object of the present invention to provide a metal work box including six relief cuts provided to allow water to escape.

It is a further object of the present invention to provide a metal work box including a blade holder to store extra saw blade in various sizes.

It is also an object of the present invention to provide a metal work box wherein the blade holder includes first and second support members oriented to support the extra saw blades.

It is another object of the present invention to provide a metal work box wherein each of the first and second support members includes a first end and a second end, wherein the first ends are positioned above the second ends, and the respective first ends are further apart than the respective second ends so as to define a substantially V-shaped space between the first and second support members in which the saw blades are positioned when it is desired to store them.

It is a further object of the present invention to provide a metal work box wherein the blade holder further includes a cross brace between the first and second support members.

It is also an object of the present invention to provide a metal work box including two vertical cylinders formed within the box for storage.

It is another object of the present invention to provide a metal work box including retroreflective tape secured thereto for enhancing night visibility.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 4 is a detailed view of the latch.

FIG. 5 is a detailed view of the first chain fastener secured to the interior of the left third side wall, and the second chain fastener secured to the interior of the right fourth side wall is an identical mirror image thereof.

FIG. 6 is a detailed view of the V-shaped blade holder.

DESCRIPTION OF THE PREFERRED EMBODIMENT

Figure 1:
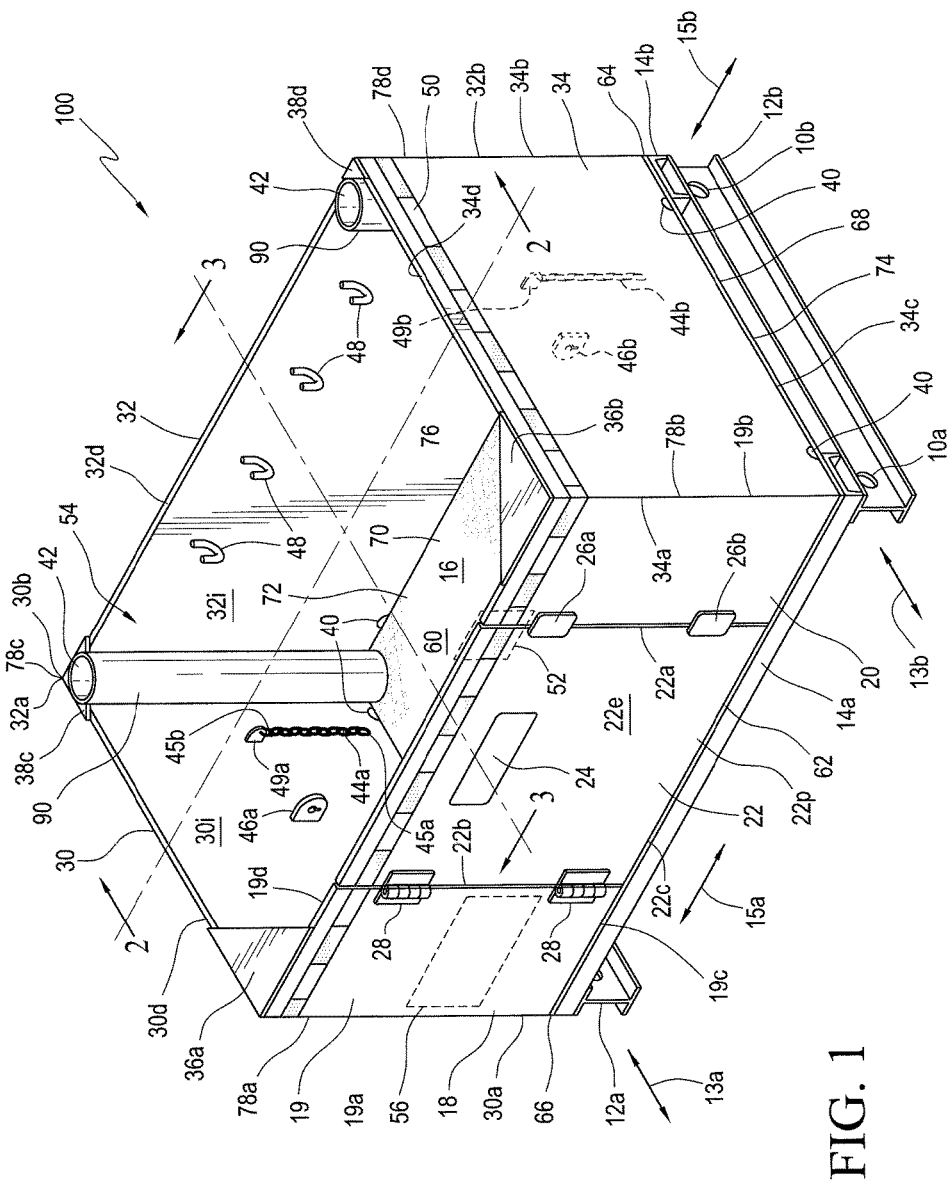
FIG. 1 is a perspective view of the work box in accordance with the present invention.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Briefly, and with reference to FIGS. 1 to 6, a steel work box 100 is disclosed. While the work box 100 is disclosed herein as being constructed from steel, it is appreciated other metals may be used so long as they provide for the strength, stability and durability required for operation of the present work box at a construction site.

Briefly, the work box 100 includes a door 22 on hinges 28 enabling easy access to the contents of the work box 100 and making adding or removing heavy objects from the work box 100 much easier. The company's logo 24 will be attached to the face of the door 22.

The door 22 is provided with two tabs 26a, 26b, which are secured to an exterior 22e (that is, the face) of the door 22, to prevent overswing to the inside of the work box 100 and a latch 52 (see FIG. 4) to keep the door 22 securely closed. The latch 52 is located on the interior 54 of the work box 22 to prevent damage to the latch 52 itself. The latch 52 is not visible in FIG. 1 but is located within the broken lines where specified.

The work box 100 is endowed with two vertical cylinders 42 on opposite sides thereof for storage. The cylinders 42 provide storage space for relatively thin elongated tools, for examples, rakes, shovels, where the handles thereof may be positioned within the cylinders 42. Retroreflective tape 50 completely encompasses the work box 100 for night visibility. The work box 100 has an anti-slip textured coating on the floor 16 thereof for safety.

First and second elongated C-channel bars 14a, 14b enable the work box 100 to bear more weight and first and second long I-beams 12a, 12b elevate the work box 100 to allow for access to an open space along the bottom of the work box 100 such that the work box may be lifted and relocated by a fork lift or other construction vehicle including a fork type accessory. The I-beams 12a, 12b have two holes 10a, 10b each to create tie down points on each outside corner.

The work box 100 also includes four hooks 48 for hanging or securing tools on the interior 32i of the rear second side 32 thereof. Further, the work box 100 is provided with two chains 44a, 44b and two chain fasteners (for example, key-hole bracket members) 46a, 46b permanently attached to the interior 30i, 34i of the right fourth side wall 34 and the left third side wall 30. In accordance with a preferred embodiment, a first chain 44a and a first chain fastener 46a are secured to the interior 30i of the left third side wall 30 in spaced relationship such that the free end 45a of the first chain 44a may be drawn over to the first chain fastener 46a and selectively secured thereto so as to enable the first chain 44a to hold equipment against the interior 30i of the left third side wall 30. Similarly, a second chain 44b and a second chain fastener 46b are secured to the interior 34i of the right fourth side wall 34 in spaced relationship such that the free end 45a of the second chain 44b may be drawn over to the second chain fastener 46b and selectively secured thereto so as to enable the second chain 44b to hold equipment against the interior 34i of the right fourth side wall 34.

Each of the chains 44a, 44b is of a standard chain link construction and include a free first end 45a and a fixed second end 45b. The fixed second ends 45b are fixedly secured to the respective interior 30i of the left third side wall 30 and the interior 34i of the right fourth side wall 34 (via coupling tab members 49a, 49b, respectively). In this way, and with the fixed second ends 45b of the chains 44a, 44b spaced from the chain fasteners 46a, 46b, the first ends 45a may be lifted a drawn over to the chain fasteners 46a, 46b secured to the respective interior 30i of the left third side wall 30 and the interior 34i of the right fourth side wall 34.

Referring to FIG. 5, which shows the details of the first chain fastener 46a (it should be appreciated the second chain fastener 46b, although not shown in detail is an identical mirror image of the first chain fastener 46a), the chain fasteners, which in accordance with a preferred embodiments are also referred to as key-hole bracket members 46a, 46b, are substantially planar members each having an aperture 47 shaped and dimensioned for supporting and retaining a free first end 45a, 45a of a respective chain 44a, 44b. The aperture 47 includes a circular section 47a having a diameter sufficient to allow for the passage of the chain 44a, 44b therethrough. The aperture 47 also includes an elongated rectangular section 47b extending downwardly from the circular section 47a. The elongated rectangular section 47b has a width that is slightly larger than the thickness of chain links intended to be supported thereby. In this way, a length of chain 44a, 44b may be drawn through the circular section 47a of the aperture 47 and, once a desired length has been drawn therethrough, a chain link may be slid downwardly within the elongated rectangular section 47b of the aperture 47 where it is held in position because the chain links before and after the chain link held within the elongated rectangular section 47b are blocked due to the orientation of the chain links transverse to the chain link held within the elongated rectangular section 47b. It is appreciated the right fourth side wall 34 is a mirror image of the left third side wall 30, but is not viewable in FIG. 1 and the second chain 44b, second chain fastener 46b, and coupling tab member 49b are, therefore, shown in broken lines.

Each of the four corners has a gusset. The first and second front gussets 36a, 36b are sized to accommodate vises, as well as provide for support and stability. The first and second rear gussets 38a, 38b provide support, stability and prevent unwanted objects from falling behind the two vertical cylinders 42. To prevent water accumulation inside the work box 100 six relief cuts 40 are formed in the lower edges of the rear second side wall 32, the left third side wall 30 and the right fourth side wall 34 to allow water to escape. Again, the left third side wall 30 and the right fourth side wall 34 are mirror images and the rear second side wall 32 has a relief cut 40 in a corner not shown in FIG. 1 near the right fourth side wall 34. The work box 100 also includes steel V-shaped blade holder 56 with a cross brace 58 to store extra saw blade in various sizes.

Figure 2:
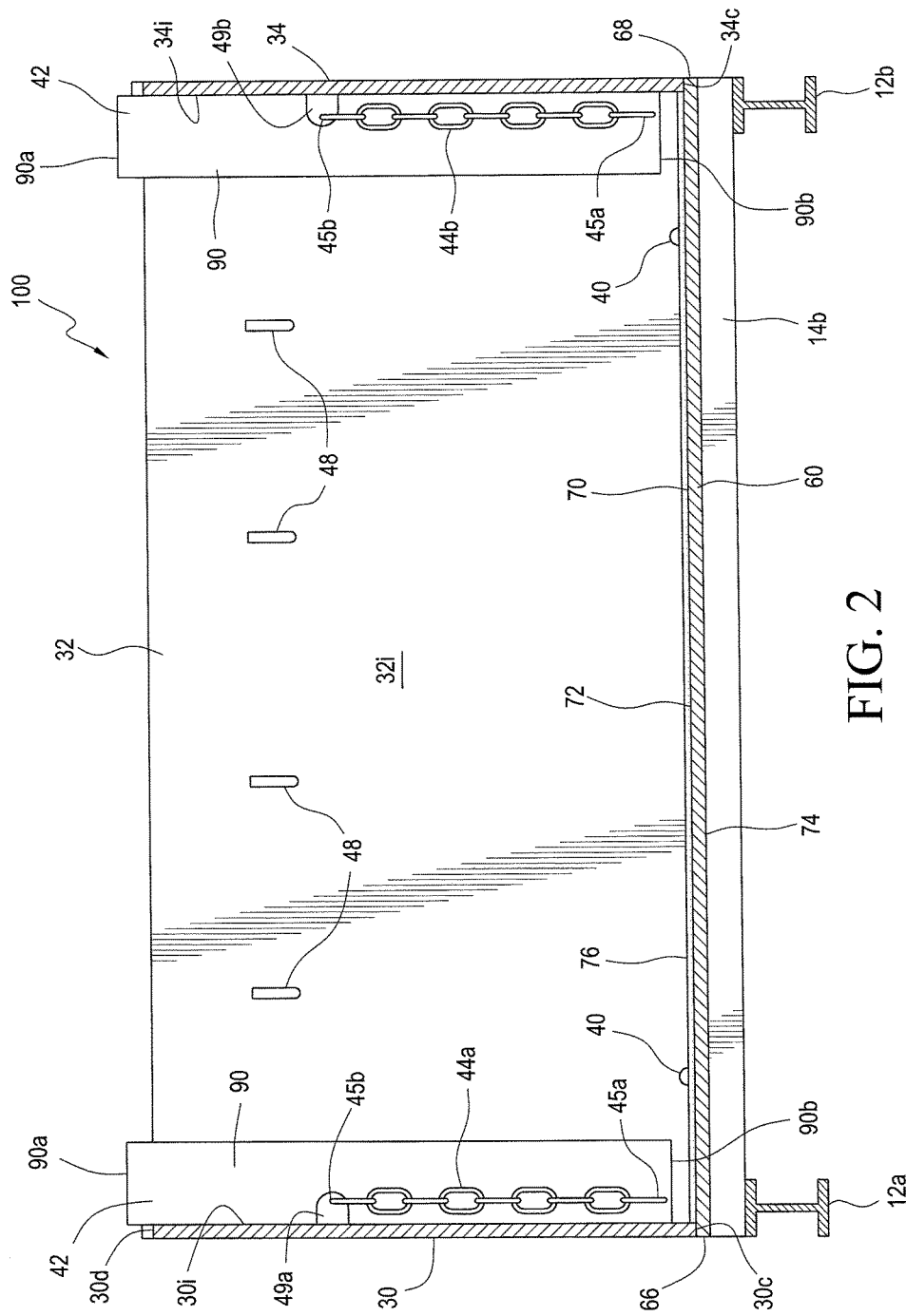
FIG. 2 is a cross sectional view along the line 2-2 in FIG. 1.
Figure 3:
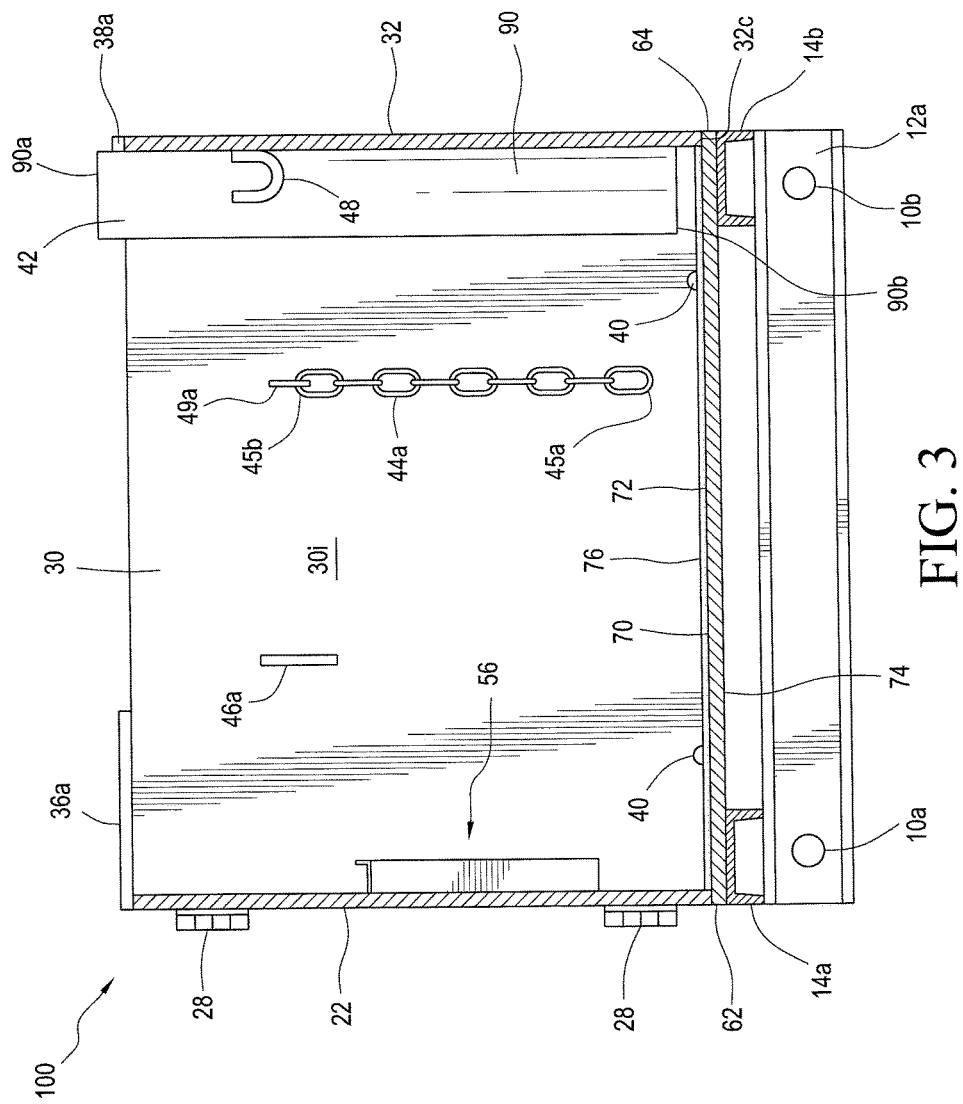
FIG. 3 is a cross sectional view along the line 3-3 in FIG. 1.

More particularly, and with reference to FIGS. 1, 2 and 3, the metal work box 100 includes an elevated multi-part base 60 having a front first edge 62, a rear second edge 64, a left side (when viewed from the front of the work box 100) third edge 66, and a right side (when viewed from the front of the work box 100) fourth edge 68. The base 60 also includes a horizontal planar member 70 having an upper surface 72 and a lower surface 74, wherein the upper surface 72 defines the floor 16 of the work box 100 and the lower surface 74 supports the work box 100 at the work site and allows for ready transport thereof. The upper surface 72 of the horizontal planar member 70 is provided with an anti-slip textured coating 76 for safety. In accordance with a preferred embodiment, the anti-slip textured coating 76 is HERCULINER™, a polyurethane and rubber granule coating that is put on thick for a rougher surface.

As for the lower portion of the base 60, that is, that portion of the base 60 extending downwardly from the lower surface 74 of the horizontal planar member 70, it is provided with first and second elongated C-channel bars 14a, 14b that enable the work box 100 to bear more weight. The first and second elongated C-channel bars 14a, 14b are secured directly to the lower surface 74 of the horizontal planar member 70 adjacent the front first edge 62 and the rear second edge 64 such that the longitudinal axes 15a, 15b of the first and second elongated C-channel bars 14a, 14b are parallel to the front first edge 62 and the rear second edge 64.

The lower portion of the base 60 is also provided with first and second I-beams 12a, 12b to elevate the work box 100 and allow for relocation. The first and second I-beams 12a, 12b are secured directly to the bottom surfaces of the first and second elongated C-channel bars 14a, 14b adjacent the left side third edge 66 and a right side fourth edge 68 such that the longitudinal axes 13a, 13b of the first and second I-beams 12a, 12b are parallel to the left side third edge 66 and a right side fourth edge 68.

Each of the first and second I-beams 12a, 12b is provided with two holes 10a, 10b. The holes 10a, 10b are located adjacent the respective ends of the first and second I-beams 12a, 12b and provide tie down points on each outside corner of the work box 100.

The work box 100 includes plurality of side walls secured to and extending upwardly from the upper surface 72 of the horizontal planar member 70 along the respective front first edge 62 of the base 60 of the work box 100, rear second edge 64 of the base 60 of the work box 100, left side third edge 66 of the base 60 of the work box 100, and right side fourth edge 68 of the base 60 of the work box 100. In accordance with a preferred embodiment, the plurality of side walls are composed of a front first side wall 19 formed along the front first edge 62 of the base 60 of the work box 100, a back second side wall 32 formed along the rear second edge 64 of the base 60 of the work box 100, a left third side wall 34 formed along left side third edge 66 of the base 60 of the work box 100, and right fourth side wall 34 formed along the right side fourth edge 68 of the base 60 of the work box 100.

In accordance with a preferred embodiment, the work box 100 exhibits a rectangular configuration, and as such the front first side wall 19 and the back second side wall 32 are long side walls while the left third side wall 30 and the right fourth side wall 34 are short side walls. With this in mind, the work box 100 includes four corners 78a-d. The front first and second corners 78a, 78b are defined by the intersection of the vertical edges 19a, 19b of the front first side wall 19 with the front vertical edge 30a of the left third side wall 30 and the front vertical edge 34a of the right fourth side wall 34. The rear third and fourth corners 78c, 78d are defined by the intersection of the vertical edges 32a, 32b of the rear second side wall 32 with the rear vertical edge 30b of the left third side wall 30 and the rear vertical edge 34b of the right fourth side wall 34.

As briefly explained above, each of the front first and second corners 78a, 78b and the rear third and fourth corners 78c, 78d includes a gusset 36a, 36b, 38a, 38b. In accordance with a preferred embodiment, the gussets 36a, 36b formed at the front first and second corners 78a, 78b are sized to accommodate vises (while also providing for support and stability), while the gussets 38a, 38b formed at the rear third and fourth corner 78c, 78d are sized to support, stability and prevent unwanted objects from falling behind cylinders 42.

Each of the front first side wall 19, the rear second side wall 32, the left third side wall 30 and the right fourth side wall 34 include a bottom edge 19c, 32c, 30c, 34c, a top edge 19d, 32d, 30d, 34d and lateral vertical edges 19a, 19b, 32a, 32b, 30a, 30b, 34a, 34b. With regard to the rear second side wall 32, the left third side wall 30 and the right fourth side wall 34, the bottom edges 32c, 30c, 34c are fixedly secured, for example, by welding, to the respective rear second edge 62, left side third edge 66, and right side fourth edge 68 of the base 60 so as to form a rigid structure when the respective adjacent lateral edges 32a, 32b, 30a, 30b, 34a, 34b thereof are also secured to define the rear corners 78c, 78d as discussed above.

However, the front first side wall 19 is provided with a door 22 allowing access to the interior of the present work box 100. As such, the front first side wall 19 is composed of the left front hinge side wall portion 18 and right front latch side wall portion 20, as well as the door 22 that extends between the left front hinge side wall portion 18 and right front latch side wall portion 20. The left front hinge side wall portion 18 and right front latch side wall portion 20 are rigidly and fixedly secured to the adjacent base 60 along the front first edge 62 (via the bottom edge 19c of the front first side wall 19 of which the left front hinge side wall portion 18 and right front latch side wall portion 20 form part of), as well as the left third side wall 30 and right fourth side wall 34 (via the respective lateral vertical edges 19a, 19b of the front first side wall 19 of which the left front hinge side wall portion 18 and right front latch side wall portion 20 form part of and the lateral vertical edges 30a, 34a of the left third side wall 30 and right fourth side wall 34) so as to provide a static rigid support structure for the door 22.

The door 22 itself is composed of a door panel 22p having a free vertical door edge 22a, a hinged vertical door edge 22b, an upper door edge 22d, and a lower door edge 22c. The hinged vertical door edge 22b is pivotally secured to the left front hinge side wall portion 18 so as to allow the door 22 to swing from an open to a closed configuration. In the open configuration, the door 22 swings away from the interior 54 of the work box 100 while in its closed configuration, the door 22 is in alignment with the left front hinge side wall portion 18 and right front latch side wall portion 20. Limited motion of the door 22, so that it does not extend into the interior 54 of the work box 100, is provided by the provision of first and second door tabs 26a, 26b secured to the exterior 22e of the door panel 22p and extending beyond the free vertical edge 22a of the door panel 22p. The first and second tabs 26a, 26b are formed along the exterior 22e of the door panel 22p such that they engage the free edge 20a of the right front latch side wall portion 20 as the door 22 swings from its open configuration to its closed configuration. Through the provision of the first and second tabs 26a, 26b, in conjunction with the hinged structure, one is able to open the door 22 allowing for easy access to the contents of the work box 100 while preventing over swing of the door 22 to the inside of the work box 100.

Locking of the door 22 is facilitated through the provision of a spring-loaded latch 52, composed of latch members 52a, 52b, extending between the right front latch side wall portion 20 and the free vertical edge 22a of the door panel 22p. The latch 52 allows for selective latching of the door panel 22p to the remainder of the front first side wall 19, in particular, the right front latch side wall portion 20, to keep the door 22 securely closed when desired and to allow access to the interior of the work box 100 when desired. Improved functionality is achieved by positioning the latch 52 along the interior surfaces 22i, 20i of the door panel 22p and the right front latch side wall portion 20. By positioning the latch 52 within the interior 54 of the work box 100, damage to the latch 52 is minimized.

In addition, storage within the work box 100 is facilitated through the provision of two vertical cylinders 42. The vertical cylinders 42 are preferably positioned in the rear corners 78c, 78d of the work box 100. Each of the vertical cylinders 42 include a vertically tubular member 90, preferably formed of steel, with an open upper end 90a and an open lower end 90b. The lower end 90b is elevated above the horizontal planar member 70, allowing debris to pass therethrough such that it will not build up within the vertical cylinders 42.

In addition, retroreflective tape 50 is used to enhance night visibility of the work box 100. With this in mind, retroreflective tape 50 is positioned about the work box 100 in visible locations, for example, retroreflective tape 50 may be positioned to completely encompass the plurality of side walls 19, 30, 32, 34 (and door) of the work box 100 in such a way that the work box 100 is completely visible and readily identified.

As discussed above, storage within the work box 100 is enhanced by the provision of hooks 48 along the interior surfaces of the side walls. In accordance with the preferred embodiment, four hooks 48 are formed along the interior surface 32i of the rear second side wall 32. Still further, and considering that the work box 100 will be exposed to the environment, water accumulation within the work box 100 is prevented by providing six relief cuts 40 are formed in the lower edges of the rear second side 32, the left third side wall 30 and the right fourth side wall 34. In particular, the relief cuts 40 are formed in the rear second side wall 32, the left third side wall 30 and the right fourth side wall 34 at the intersection of the respective bottom edges 32c, 30c, 34c of the side walls 32, 30, 34 with the rear second edge 62, left side third edge 64 and right side fourth edge 66 of the base 60.

A steel V-shaped blade holder 56 is also formed within the work box 100 to provide for the storage of extra sawblades of various sizes. The V-shaped blade holder 56 is formed along the interior surface 18i of the left front hinge side wall portion 18 and includes first and second angularly oriented support members 80, 82 with a cross brace 58 extending therebetween. Each of the first and second angularly oriented support members 80, 82 are L-shaped when viewed along a cross section taken perpendicular to the longitudinal axis thereof. As such, each of the first and second angularly oriented support members 80, 82 includes a first leg 84 and a second leg 86 that are orientation perpendicular to each other. The free first end 84a of the first leg 84 is secured to the interior surface 18i of the left front hinge side wall portion 18 with the second leg 86 extending upwardly such that the first leg 84 is oriented perpendicular to the plane in which the left front hinge side wall portion 18 lies and the second leg 86 is oriented parallel to the plane in which the left front hinge side wall portion 18. In this way a recess 88 is defined by the interior surface 18i of the left front hinge side wall portion 18, the first leg 84 and second leg 86.

The first and second support members 80, 82 are oriented such that their respective longitudinal axes are oriented perpendicular to each other, with the first and second support members 80, 82 being oriented at approximately 45 degree angles relative to the plane in which the horizontal planar member 70 lies. That is, and considering that each of the first and second support members 80, 82 includes a first end 80a, 82a and a second end 80b, 82b, wherein the first ends 80a, 82a are positioned above the second ends 80b, 82b, the respective first end 80a, 82a are further apart than the respective second ends 80b, 82b defining a substantially V-shaped space 89 between the first and second support members 80, 82 in which the saw blades are positioned when it is desired to store them. With such an orientation, the recesses 88 defined by the first and second support members 80, 82 is shaped and dimensioned for supporting circular saw blades that are placed within the recesses with the saw blades orientation substantially parallel to the plane in which the left front hinge side wall portion 18 lies. Support of the saw blades within the recesses 88, as well as support of the first and second support members 80, 82 relative to each other is provided by securing a cross brace 58 between the first and second support members 80, 82, in particular, securing a cross brace 58 to the respective second legs 86 of the first and second support members 80, 82.

Ultimately, the metal work box 100 in accordance with the present invention provides a storage means that is durable and reliable so to withstand being transported by heavy equipment, bare the load of heavy tools and small machinery stored inside thereof, and act in a manner protecting the contents thereof.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A metal work box, comprising:
  a base including a horizontal planar member having an upper surface and a lower surface,
  a plurality of side walls secured to and extending upwardly from the base, the plurality of side walls including a front first side wall formed along a front first edge of the base, a back second side wall formed along a rear second edge of the base, a left third side wall formed along a left side third edge of the base, and a tight fourth side wall formed along a right side fourth edge of the base;
  a door formed along the front first side wall, the door including a door panel having a free edge and a hinged edge, the hinged edge being pivotally secured to a front hinge side wall portion of the front first side wall so as to enable easy access to contents; and the front first side wall also includes a latch extending between a front latch side wall portion of the front first side wall and the free edge of the door panel to allow for selective latching of the door panel to the front latch side wall portion to keep the door securely closed, wherein the latch is positioned along interior surfaces of the door panel and the front latch side wall portion, and the free edge of the door panel includes two tabs extending beyond the free edge of the door panel so as to engage a front latch side wall portion of the first front side wall and prevent over swing of the door to the inside.

2. The metal work box according to claim 1, wherein the upper surface of the horizontal planar member is provided with an anti-slip textured coating for safety.

3. The metal work box according to claim 1, wherein the base includes first and second elongated C-channel bars secured to the lower surface of the horizontal planar member increasing the ability of the work box to bear more weight.

4. The metal work box according to claim 3, wherein the base includes first and second I-beams secured to the first and second elongated C-channel bars to elevate the work box and allow for relocation.

5. The metal work box according to claim 4, wherein each of the first and second I-beams has two holes to create tie down points.

6. The metal work box according to claim 1, further including a plurality of hooks formed along at least one of the plurality of side walls for hanging or securing tools.

7. The metal work box according to claim 1, further including two chains and two chain fasteners permanently attached to at least one of the plurality of side walls.

8. The metal work box according to claim 1, wherein the work box includes four corners defined by the intersection of the front first side wall with the respective left third side wall and right fourth side wall and the intersection of the rear second side wall with the respective left third side wall and right fourth side wall, wherein each of the four corners includes a gusset.

9. The metal work box according to claim 8, wherein the gussets adjacent the front first side wall are sized to accommodate vises as well as provide for support and stability, while the gussets adjacent the rear second side wall provide support and stability.

10. The metal work box according to claim 1, further including two vertical cylinders formed within the box for storage.

11. A metal work box, comprising:
a base including a horizontal planar member having an upper surface and a lower surface,
a plurality of side walls secured to and extending upwardly from the base, the plurality of side walls including a front first side wall formed along a front first edge of the base, a back second side wall formed along a rear second edge of the base, a left third side wall formed along a left side third edge of the base, and a right fourth side wall formed along a right side fourth edge of the base;
a door formed along the front first side wall, the door including a door panel having a free edge and a hinged edge, the hinged edge being pivotally secured to a front hinge side wall portion of the front first side wall so as to enable easy access to contents;

the front first side wall also includes a latch extending between a front latch side wall portion of the front first side wall and the free edge of the door panel to allow for selective latching of the door panel to the front latch side wall portion to keep the door securely closed; and further including a blade holder to store extra saw blade in various sizes, the blade holder includes first and second support members oriented to support extra saw blades, wherein each of the first and second support members includes a first end and a second end, wherein the first ends are positioned above the second ends, and the respective first ends are further apart than the respective second ends so as to define a substantially V-shaped space between the first and second support members in which the saw blades are positioned when it is desired to store them.

12. The metal work box according to claim 11, wherein the blade holder further includes a cross brace between the first and second support members.

13. A metal work box, comprising:
a base including a horizontal planar member having an upper surface and a lower surface;
a plurality of side walls secured to and extending upwardly from the base, the plurality of side walls including a front first side wall formed along a front first edge of the base, a back second side wall formed along a rear second edge of the base, a left third side wall formed along a left side third edge of the base, and a right fourth side wall formed along a right side fourth edge of the base;
a door formed along the front first side wall, the door including a door panel having a free edge and a hinged edge, the hinged edge being pivotally secured to a front hinge side wall portion of the front first side wall so as to enable easy access to contents; and further including a chain and a chain fastener permanently attached to at least one of the plurality of side walls, wherein the chain fastener includes an aperture having a circular section with a diameter sufficient to allow for passage of the chain therethrough and an elongated rectangular section extending downwardly from the circular section, the elongated rectangular section having a width that is slightly larger than a thickness of chain links of the chain such that a length of the chain may be drawn through the circular section of the aperture and, once a desired length has been drawn therethrough, a chain link may be slid downwardly within the elongated rectangular section of the aperture where it is held in position.

14. A metal work box, comprising:
a base including a horizontal planar member having an upper surface and a lower surface;
a plurality of side walls secured to and extending upwardly from the base, the plurality of side walls including a front first side wall formed along a front first edge of the base, a back second side wall formed along a rear second edge of the base, a left third side wall formed along a left side third edge of the base, and a right fourth side wall formed along a right side fourth edge of the base;
a door formed along the front first side wall, the door including a door panel having a free edge and a hinged edge, the hinged edge being pivotally secured to a front hinge side wall portion of the front first side wall so as to enable easy access to contents; and
further including at least one vertical cylinder formed within the box for storage, the at least one vertical cylinder includes a vertically tubular member with an open upper end and an open lower end, the lower end being elevated above the horizontal planar member allowing debris to pass therethrough such that it will not build up within the at least one vertical cylinder.

* * * * *